United States Patent [19]

Subramanian

[11] Patent Number: 4,966,941

[45] Date of Patent: Oct. 30, 1990

[54] NYLON COMPOSITIONS FOR BLOWMOLDING

[75] Inventor: Pallatheri M. Subramanian, Hockessin, Del.

[73] Assignee: E. I. Du Pont de Nemours and Company, Wilmington, Del.

[21] Appl. No.: 299,711

[22] Filed: Jan. 19, 1989

Related U.S. Application Data

[63] Continuation-in-part of Ser. No. 73,224, Jul. 14, 1987, abandoned.

[51] Int. Cl.$^5$ .............................................. C08L 77/00
[52] U.S. Cl. ...................................... 525/66; 525/179; 525/183
[58] Field of Search ................... 525/66, 179, 183

[56] References Cited

U.S. PATENT DOCUMENTS

| | | | |
|---|---|---|---|
| Re. 28,646 | 12/1975 | Hedrick et al. | 260/37 N |
| 2,975,128 | 3/1961 | Stott | 252/12 |
| 3,005,795 | 10/1961 | Busse et al. | 260/45.5 |
| 3,676,400 | 7/1972 | Kohan et al. | 260/857 L |
| 3,773,707 | 11/1973 | Hermann | 260/37 N |
| 3,833,534 | 9/1974 | Tierney et al. | 260/37 N |
| 3,843,591 | 10/1974 | Hedrick et al. | 260/37 N |
| 3,845,163 | 10/1974 | Murch | 260/857 L |
| 3,879,301 | 4/1975 | Cairns | 252/12 |
| 3,931,094 | 1/1976 | Segal et al. | 260/37 N |
| 3,966,839 | 6/1976 | Sims | 260/85 UN |
| 3,988,287 | 10/1976 | Inokuchi et al. | 260/37 N |
| 3,994,814 | 11/1976 | Cairns | 252/12.6 |
| 3,997,494 | 12/1976 | Lever et al. | 260/42.42 |
| 4,001,124 | 1/1977 | Hussey | 252/12 |
| 4,105,709 | 8/1978 | Iwami et al. | 260/857 L |
| 4,159,286 | 6/1979 | Khattab et al. | 260/857 |
| 4,174,358 | 11/1979 | Epstein | 525/183 |
| 4,314,929 | 2/1982 | Mahoney, Jr. | 260/42.15 |
| 4,318,839 | 3/1982 | Newbould et al. | 524/538 |
| 4,319,007 | 3/1982 | Khattab | 525/431 |
| 4,321,336 | 3/1982 | Meyer et al. | 525/183 |
| 4,387,184 | 6/1983 | Coguard et al. | 525/183 |
| 4,391,951 | 7/1983 | Scheetz | 525/166 |
| 4,412,040 | 10/1983 | Albee, Jr. et al. | 525/143 |
| 4,478,978 | 10/1984 | Roura | 525/66 |
| 4,491,553 | 1/1985 | Yamada et al. | 264/51 |
| 4,500,603 | 2/1985 | Freundlich | 428/409 |
| 4,528,303 | 7/1985 | Segaud | 523/212 |
| 4,532,100 | 7/1985 | Lancaster et al. | 264/564 |
| 4,603,172 | 7/1986 | Albee et al. | 525/143 |

OTHER PUBLICATIONS

CPI Prior Art Search Report No. P-87-5307-N,O Title: High Melt Strength Nylons for Blow Molding.

Primary Examiner—Ana L. Carrillo

[57] ABSTRACT

It has now been found that a unique combination of additives makes semi-crystalline polyamides readily processible by extrusion blowmolding to make hollow, stiff parts of various shapes. The compositions consist essentially of semicrystalline polyamide, a selected toughening agent and an anhydride-rich ethylene copolymer, and a fibrillar polytetrafluoroethylene.

3 Claims, No Drawings

NYLON COMPOSITIONS FOR BLOWMOLDING

CROSS-REFERENCE TO RELATED APPLICATION

This application is a continuation-in-part of application Ser. No. 073,224 filed July 14, 1987.

BACKGROUND OF THE INVENTION

Polyamides that are semicrystalline are used extensively in many applications that require good solvent resistance and good properties at elevated temperatures. They are ordinarily processed by injection molding, but there are many components of automobiles and other systems wherein such parts are hollow and to manufacture these by injection molding is very difficult and expensive. Many such parts can conceivably be made by blowmolding provided the polymer system has adequate melt strength and viscosity. Unfortunately, polyamides commonly used for injection molding have number average molecular weights generally between 10000 and 25000 which is too low to make them suitable for extrusion blowmolding. It would be desirable to have a blow moldable polyamide composition made from the usual injection moldable polyamides.

For many applications polyamide compositions with improved toughness are required. The prior art describes various techniques of modifying polyamides with tougheners. Such tougheners include low modulus ethylene copolymers containing small amounts of carboxyl or anhydride functionality. Other tougheners include ethylene acid copolymers neutralized with metal cations (see Epstein U.S. Pat. No. 4,174,358 or Murch U.S. Pat. No. 3,845,163). Combinations of polyamides with such tougheners afford unique combinations that are tough and suitable for injection molding and extrusions. These combinations, however, possess lower than optimum viscosities and melt strength for use in blowmolding.

SUMMARY OF THE INVENTION

Recently, in a companion patent application, the melt viscosities of such combinations of polyamides and the aforementioned toughening polymers are increased substantially by addition of small amounts of an anhydride rich polymer which acts as a coupling or cross-linking agent to react preferentially with the polyamide to increase molecular weight. At the same time such anhydride-rich polymers react with the acid groups in the toughening polymer as well, increasing its viscosity. Thus, addition of the anhydride-rich polymer makes the semicrystalline polyamide readily processable by extrusion blowmolding to make hollow, stiff parts of various shapes.

It has now been found that if a fibrillar fluoropolymer resin is added the amount of the anhydride-rich copolymer or the toughening polymer can be reduced.

The compositions consist essentially of:

(a) 90–65 parts by weight semicrystalline polyamide having a number average molecular weight between 10000 and 25000;

(b) 10–30 parts by weight of either:

(1) an ionic copolymer of at least one alpha-olefin and at least one alpha, beta-unsaturated organic carboxylic acid which is partially or completely neutralized with a metal cation or, (2) a mixture of a polyethylene and a functionalized polyethylene that contains up to 10% by weight carboxylic acid or anhydride functional moieties;

(c) 0.1 to 3 parts by weight of an anhydride-rich copolymer containing alternating units of maleic anhydride and an alpha-olefin, such as styrene, ethylene, or octadecene, which copolymer contains at least 15% by weight anhydride units; and (d) 0.1 to 3 parts by weight of fibrillar fluoropolymer resin.

Of course, the amounts of each additive present are relative. For example, as the amount of component (b) is decreased, the amount of component (c) should be increased, and as more component (b) is employed, the amount of (c) can be decreased. The same principle is true for component (d).

These compositions have high melt strength compared to the base polyamide. This property aids in making the compositions blow-moldable. The compositions are readily processible by extrusion blowmolding to make hollow parts, such as containers or automotive components for under-the-hood applications.

DETAILED DESCRIPTION OF THE INVENTION

The polyamide matrix resin of the compositions of this invention is well known in the art and embraces those semi-crystalline resins having a molecular weight of between about 10000 and 25000 and commonly referred to as nylons. Suitable polyamides include those described in U.S. Pat. Nos. 2,071,250; 2,071,251, 2,130,523; 2,130,948; 2,241,322, 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon); the polyamide produced by ring opening of lactams, i.e., polycaprolactam, polylauric lactam; poly-11-aminoundecanoic acid, and bis(paraaminocyclohexyl) methane dodecanoamide. It is also possible to use in this invention polyamides prepared by the copolymerization of two of the above polymers or terpolymerization of the above polymers or their components; e.g., an adipic, isophthalic acid hexamethylene diamine copolymer. Preferably the polyamides are linear with a melting point in excess of 200° C. By "semicrystalline" is meant that the polyamide has a distinct melting point with a measurable heat of fusion, as described in U.S. Pat. No. 4,410,661 in Columns 1 and 2.

The ionic copolymer is made of recurring units of at least one alpha-olefin and at least one alpha, beta-unsaturated carboxylic acid, in which the acid moiety is at least partially ionized with metal ions. The alpha-olefin is preferably of 2–6 carbon atoms and the acid is preferably of 3–6 carbon atoms. Preferably the alpha-olefin is ethylene and the acid isacrylic or methacrylic acid. Other polymerizable comonomers can be present, such as acrylates or methacrylates. The metal ion can be monovalent, divalent or trivalent, as for example Na, Zn, Al, K and the like. Representative copolymers include ethylene/isobutylacrylate/methacrylic acid (80/10/10) 70% zinc neutralized.

When unmodified polyethylene is used, an anhydride modified polyethylene (modified with 1% maleic anhydride) is used as a compatibilizer. The polyethylene used can be high or low density. The functionalized polyethylene can be a polyethylene that contains up to 10% carboxylic acid or anhydride functionality. These are described in Epstein U.S. Pat. No. 4,174,358. The ratio of polyethylene to functionalized polyethylene is preferably 1:1 to 2:1 by weight.

Small amounts of an anhydride-rich polymer comprise the third additive component. This component can be an alternating polymer of styrene and maleic anhydride (e.g., SMA 3000 sold by ARCO Chemical), an alternating polymer of ethylene and maleic anhydride (e.g., ethylene-maleic anhydride polymer EMA-31 manufactured by Monsanto Chemical Company), or a higher alpha-olefin/maleic anhydride polymer (e.g., Octadecene-maleic anhydride polymer PA-18 made by Gulf Oil Company). By alternating is meant that the units substantially alternate between comonomers.

The fibrillar fluoropolymer resin is preferably a non-melt-fabricable tetrafluoroethylene polymer. The tetrafluoroethylene polymers are made by the dispersion polymerization process, in which the polymer particles formed remain dispersed in the reaction mix during the polymerization. The particles are coagulated and dried. The particles fibrillate while being physically mixed into the composition of the invention.

The fibrillatable PTFE is a well known material in the art and readily available as a commercial product. The commercially available fibrillatable PTFE is in the form of an aqueous dispersion prepared by the emulsion polymerization or in the form of a powder obtained by separation of the resin from the aqueous dispersion followed by drying. The aqueous dispersion of the fibrillatable PTFE contains usually several tens of %, say, up to 60% of the PTFE particles having a diameter of about 0.2 μm while the powdery products are agglomerates of these particles of about 0.5 mm average diameter The PTFE particles of either form can be readily converted into fibrils when the particles are subjected to mechanical shearing forces.

Several of the examples of the commercially available fibrillatable PTFE are as follows: Teflon 6J (a product by Mitsui Fluorochemical Co.), Teflon 6JC (a product by the same company), Polyflon F-103 (a product of Daikin Kogyo Co.) and Polyflon F-201 (a product by the same company) as the examples of the powdery products and Teflon 30-J (a product by Mitsui Fluorochemical Co.) and Polyflons D-1 and D-2 (products by Diakin Kogyo Co.) as the examples of the aqueous dispersion products.

It has unexpectedly been discovered that if the amounts of additive ingredients are such that certain low shear/high shear viscosity ratios are obtained, good blowmolding resins are produced. For example, when the viscosity is measured at a shear rate of 3.5 per second and at a shear rate of 588 per second, it was found that if the ratio of low shear viscosity to high shear viscosity was greater than about 5 or 6 or so, the compositions could be extrusion blowmolded.

The ingredients used to make the compositions of the invention may be combined by tumble blending the components and feeding the blend to the extruder of the blowmolding equipment. It is preferable, however, that the anhydride-rich copolymer be dispersed uniformly and it has been found that melt blending the ingredients, by using such equipment as a melt extruder (e.g., single screw extruders or twin screw extruders) is preferred. The blended product is pelletized (i.e., the extruded strand is cut), dried and used for subsequent blowmolding purposes using an extrusion blowmolding machine (e.g., made by Rocheleau Inc., Hayssen Inc., etc.) and fabricated into hollow articles such as containers.

EXAMPLES

The examples set forth below were carried out using as the polyamide a 66 polyamide "Zytel" (16,000–20,000 number average molecular weight) made from adipic acid and hexamethylene diamine. The ionomeric polyolefin additive was a 70% zinc neutralized ethylene-methacrylic acid (90/10) copolymer ("Surlyn" 9520).

Anhydride-Rich Copolymers used were: SMA-3000, Styrene-Maleic anhydride copolymer by ARCO Chemical PA-18, Octadecene-Maleic anhydride copolymers made by Gulf Oil Co. (Chemicals Div.)

The fluoropolymer used was Teflon fluoropolymer 6C or 60 sold by the Du Pont Company.

Number average molecular weight was determined by Waters 150C gel permeation chromatography equipment at 110° C. with meta-cresol as a solvent.

Melt viscosity was measured on a melt capillary rheometer made by Kayeness Test Instrument. Melt flow was measured using a melt index apparatus made by F. F. Sloan Corporation, Wilmington, DE.

The materials were extrusion blended using a Sterling extruder equipped with a single screw or a Werner & Pfleiderer twin screw extruder and the polymer strands cut into pellets, dried and used to blow mold one-quart containers using a Rocheleau extrusion blowmolding machine.

Blowmoldinq Procedure

The appropriate mixture of materials were blended and melt extruded using an extruder equipped with a 2 inch screw and the polymer melt made into strands and cut into small pellets.

The pellets then were fed into a blowmolding machine which was equipped with a 1 ½ inch diameter screw and a mold to make a bottle with a volume of 1 quart. The extruder temperatures were kept at about 270° C. The vertically extruded tube of the melt (parison) was qualitatively judged for its strength by stopping the extrusion and the molten parison allowed to stand and support its own weight, before pinching and blowing to make the container. If the parison does not have adequate strength, the parison breaks off easily and the melt falls down without being able to blow and make the container. If it has good strength, the molten tube (parison) supports itself without breaking and lends itself to blowing to make the container.

CONTROL EXAMPLE 1

Using 90 parts of 66 polyamide and 10 parts ionomeric copolymer, the extruded melt did not have enough strength to support itself, broke off and fell down rapidly. No containers could be blowmolded.

CONTROL EXAMPLE 2

Adding 0.5 parts anhydride-rich copolymer to the mixture of Control Example 1 did help, but not enough to make a satisfactory container.

EXAMPLE 1

The composition of Control Example 2 (88.5 parts polyamide and 10 parts ionomeric copolymer and 0.5 anhydride-rich copolymer) was melt blended with 1 part of fluoropolymer Teflon 6C. On blowmolding as described above, good blowmolded containers were obtained.

Table I shows the ingredients used and blowmoldability results for Control Examples 1 and 2 amd for Example 1.

In a like manner, additional Examples and Controls were carried out using the ingredients shown in Table I with the blowmolding results shown in the Table.

TABLE I

EFFECT OF HIGH MOLECULAR WEIGHT "TEFLON" ON THE MELT VISCOSITIES @ 285° C. AND BLOW MOLDABILITY OF POLYHEXAMETHYLENE ADIPAMIDE BLENDS

| EXP. # | POLYAMIDE | POLYANHYDRIDE SMA 3000 | PA 18 | IONOMERIC COPOLYMER | FLUOROPOLYMER PTFE 6C | 60 | VISC. @ 3.5 PER SEC | @ 588 PER SEC | VISC. RATIO @ 3/5 SEC$^1$ 588/SEC | BLOWMOLDABILITY |
|---|---|---|---|---|---|---|---|---|---|---|
| Cont. Exp 1 | 90 | | | 10 | | | 299 | 160 | 1.87 | NO MELT STRENGTH |
| Cont. Exp 2 | 89.5 | 0.5 | | 10 | | | 956 | 267 | 3.58 | NOT ENOUGH MELT STRENGTH |
| Exp 1 | 88.5 | 0.5 | | 10 | 1 | | 2721 | 340 | 8.00 | GOOD, COULD BE BLOWMOLDED |
| Exp 2 | 89 | 0.5 | | 10 | — | 0.5 | 2661 | 338 | 7.87 | GOOD, COULD BE BLOWMOLDED |
| Exp 3 | 88.5 | 0.5 | | 10 | — | 1.0 | 2900 | 359 | 8.08 | GOOD, COULD BE BLOWMOLDED |
| Cont. Exp 3 | 80 | | | 20 | | | 239 | 187 | 1.28 | NO MELT STRENGTH COULD NOT BE BLOWMOLDED |
| Exp 4 | 78.5 | 0.5 | | 20 | 1 | | 4963 | 370 | 13.41 | BLOWMOLDS READILY |
| Exp 5 | 78.5 | 0.5 | | 20 | | 1 | 6040 | 439 | 13.78 | BLOWMOLDS WELL |
| Exp 6 | 79 | 1.0 | | 20 | | | 9090 | 526 | 17.28 | BLOWMOLDS WELL |
| Exp 7 | 78 | 1.0 | | 20 | | 1 | 9658 | 528 | 18.23 | BLOWMOLDS WELL |
| Exp 8 | 79 | | 1 | 20 | | | 6309 | 412 | 15.31 | BLOWMOLDS WELL |
| Exp 9 | 78 | | 1 | 20 | | 1 | 6608 | 463 | 14.27 | BLOWMOLDS WELL |

I claim:

1. A composition consisting essentially of
   (a) 90–65 parts by weight semicrystalline polyamide having a number average molecular weight between 10000 and 25000;
   (b) 10–30 parts by weight of either:
      (1) an ionic copolymer of at least one alpha-olefin having from 2 to 6 carbon atoms and at least one alpha, beta-unsaturated organic carboxylic acid having from 3 to 6 carbon atoms which is partially or completely neutralized with a metal cation or,
      (2) a mixture of a polyethylene and a functionalized polyethylene, said functionalized polyethylene containing up to 10% by weight carboxylic acid or anhydride functional moieties; and
   (c) 0.1 to 3 parts by weight of an anhydride-rich copolymer containing alternating units of maleic anhydride and an alpha-olefin selected from the group consisting of styrene, ethylene, and octadecene, which copolymer contains at least 15% by weight anhydride units and,
   (d) 0.1 to 3 parts by weight of a fibrillar fluoropolymer resin.

2. The composition of claim 1 wherein the polyamide is 66 nylon.

3. The composition of claim 1 or 2 wherein component (b) is an ionic copolymer of at least one alpha-olefin and at least one alpha, beta-unsaturated organic carboxylic acid, in which the acid moiety is partially neutralized with a metal cation.

* * * * *